Oct. 18, 1955 K. M. KNOX 2,721,257
DOG COLLAR LIGHT
Filed Oct. 31, 1952 2 Sheets-Sheet 1
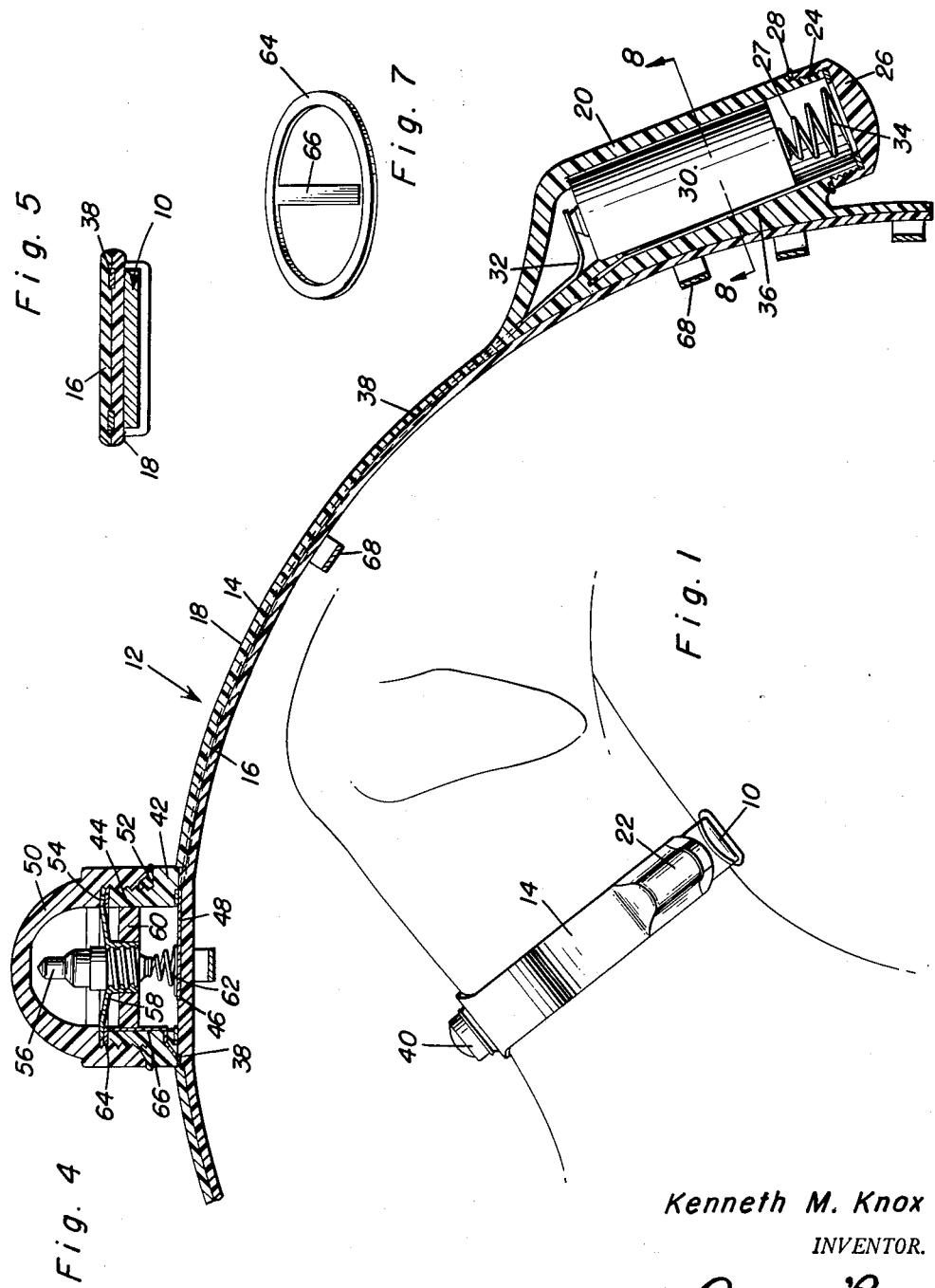
Kenneth M. Knox
INVENTOR.

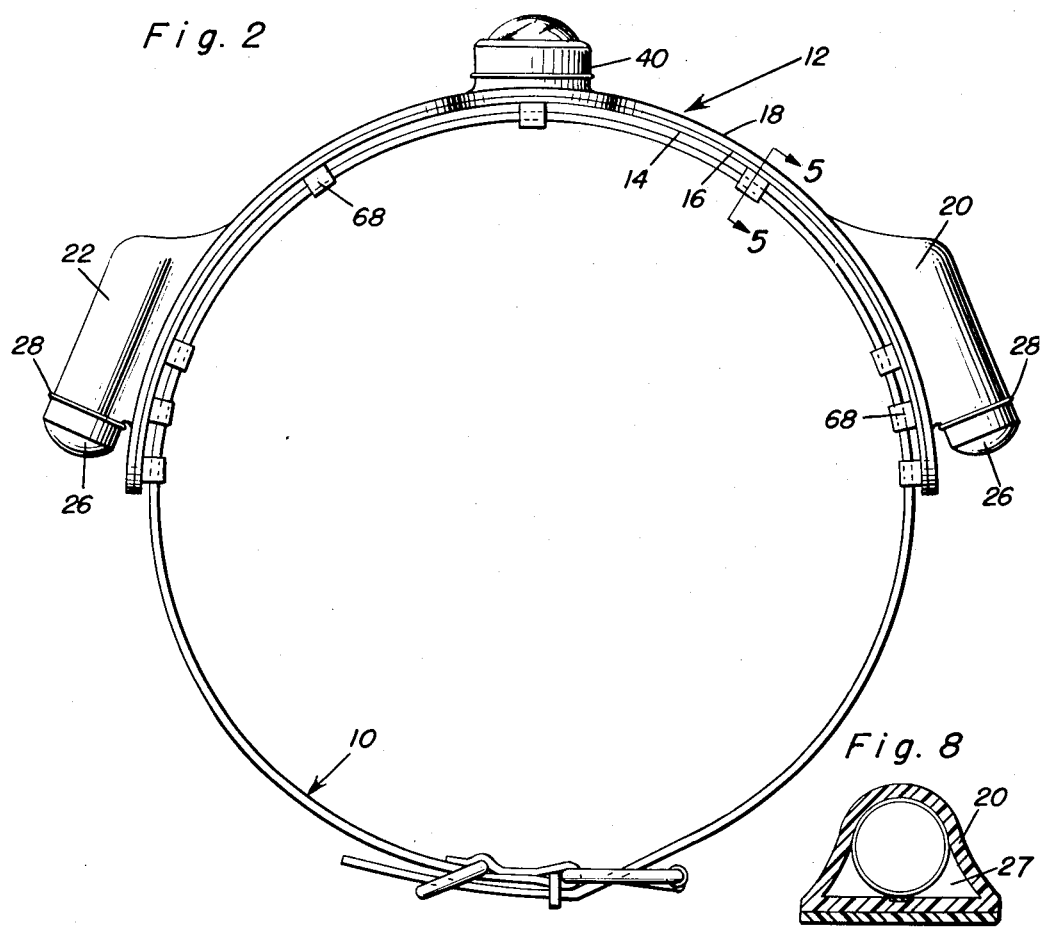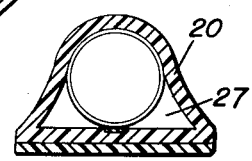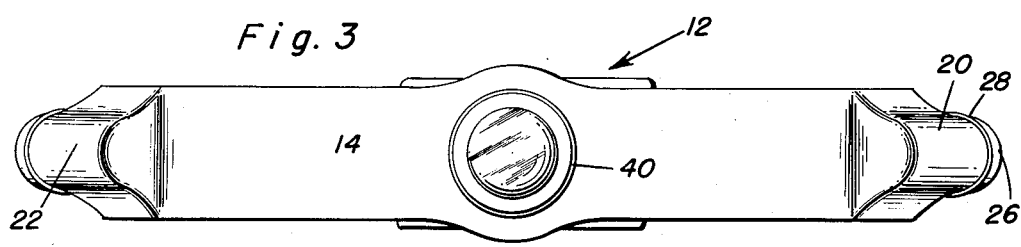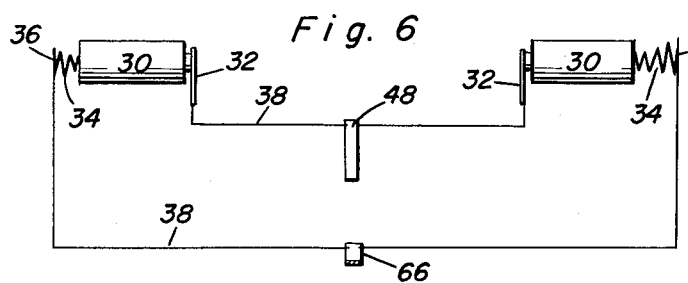

Patented Oct. 18, 1955

2,721,257

DOG COLLAR LIGHT

Kenneth M. Knox, Shreveport, La.

Application October 31, 1952, Serial No. 317,950

2 Claims. (Cl. 240—59)

This invention relates to an attachment for a dog harness and more particularly to a novel illuminating means which may be readily attached to a dog collar for several and varied purposes.

The primary object of the invention is to provide an attachment for a dog collar which will provide means for anyone to readily determine the dog's location at night.

More specifically, an object of the invention is to provide a water-proof light which may be readily attached to an animal harness which light is made of an electrically insulative and water-proof substance.

Another object is to provide combined battery cases and flotation chambers serving to provide added buoyancy to a collar and to a dog on which the collar is secured thereby preventing the added weight of the batteries from being an undue burden on a swimming dog.

A further object of the invention is to provide a light for a dog collar which has simple means for switching the light on or off.

Yet another purpose of the invention is to provide a dog collar light which is simple in construction, of minimum weight and satisfactory balance, strong, durable and water-proof, which may be readily and easily attached to a dog collar or other animal harness, and which will enable a hunter, sheep herder, or cattle man, to readily determine the location of his dog at night.

These, together with the various ancillary objects of the invention which will become apparent as the following description proceeds, are obtained by this attachment for a dog collar, a preferred embodiment of which is shown in the accompanying drawings, wherein:

Figure 1 is a pictorial representation showing the attachment secured on a dog collar which is fastened on the neck of a dog;

Figure 2 is an enlarged elevation showing the attachment secured on the collar of a dog;

Figure 3 is a top plan view of the dog collar light;

Figure 4 is a vertical cross-section of a portion of the attachment showing the elements thereof in greater detail;

Figure 5 is a vertical sectional view as taken along the plane of line 5—5 in Figure 2;

Figure 6 is a schematic wiring diagram of the electrical circuits included in the above invention;

Figure 7 is a perspective view of one of the important elements of the switch which provides means for turning the dog collar light on or off; and Figure 8 is a sectional view as taken along the plane of line 8—8 of Figure 4.

With continued reference to the accompanying drawings wherein like reference numerals designate similar parts throughout the various views, reference numeral 10 generally designates a dog collar or other animal harness upon which the dog collar light comprising the present invention is adapted to be positioned for use.

The attachment comprising the present invention which is generally indicated by the reference numeral 12 is formed from any suitable plastic, electrically insulative, and water-proof material, and consists of an elongated strap 14 which may be formed from strips 16 and 18 which may be bonded together when the elements of the invention are assembled by means of suitable solvents, or by a thermal process. The strap 14 terminates in battery cases 20 and 22 which are formed from the same material as the strap. The battery cases 20 and 22 are trapezoidal shaped in cross section and have tubular extensions 24 provided with threads which are adapted to be engaged by caps 26. The trapezoidal shape of the battery cases forms flotation chambers 27 due to the air spaces thereby formed between the batteries and the battery cases. Suitable gaskets 28 are provided to insure a water-proof closure. The batteries 30 which are positioned within the cases 20 and 22 are pressed into engagement with spring-like contact members 32 by means of coil springs 34 which terminally engage the batteries 30 and the caps 26. Contact members 36 are embedded in the battery cases 20 and 22. Wires such as are indicated at 38 are embedded between strips 16 and 18 and are terminally connected to contact members 32 and 36. The springs 34 are conductive, and interconnect the batteries with contact members 36 by engaging the contact members 36.

Centrally located on and secured to the strap 14 is a housing 40 which includes a casing member 42 of cylindrical shape which is threaded at one end as at 44. The casing member 42 extends through an opening in the strip 18 and secured between the casing 42 and the strip 16 is a base ring 46 of electrically conductive material which has an inwardly extending finger 48. A dome member 50 is threadedly engaged with the casing 42 and a suitable gasket 52 is provided to insure a water-proof connection. The dome 50 is formed with an internal annular flange 54.

The illuminating means for this invention includes a conventional bulb 56 which is positioned in threaded engagement within the usual and conventional combined reflector and holder 58. A bushing 60 is provided for insulating the holder 58. Biasing the bulb 56 and hence the reflector holder 58 into engagement with the flange 54 is a coil spring 62 which is also in electrical contact with the finger 48. There is provided an upper ring 64 which has a downwardly extending tooth 66 formed integrally therewith. A wire 38 is secured in electrical engagement with the tooth 66 which is carried by the portion 44 of the casing 42.

In use, the attachment is secured on the collar of a dog by means of loops 68 formed integrally with the strip 16. In order to illuminate the bulb 56 so as to shine a light vertically, it is merely necessary to screw the dome 50 so as to compress the spring 62 and force the reflector 58 into engagement with the ring 64 so as to complete an operative electrical circuit between the batteries 30 and the bulb 56. Obviously, the ring 46 and the finger 48 are connected by a wire 38 to contact 32 of the battery and the spring 62 conducts current through the base of the bulb 56. The complete circuit is made by means of the conductive base and reflector 58 through the ring 64 and finger 66 through the wire 38 back to the contact member 36.

Accordingly, it is believed to be readily apparent that one but needs to screw the dome 50 downwardly over the casing 42 to light the lamp thus providing an easy means for causing illumination. Furthermore, the assembly is water-proof and may be made from light and inexpensive materials. Since from the foregoing the construction and other advantages of this attachment are readily apparent, further description is believed to be unnecessary.

However, since numerous modifications will readily occur to those skilled in the art after a consideration of the foregoing specification and accompanying drawings, it is not intended to limit the invention to the precise embodiment of dog collar light shown and described but also modifications and equivalents may be readily resorted to which fall within the scope of the appended claims.

Having described the invention, what is claimed as new is:

1. An animal harness light comprising an elongated flexible electrically insulative strap, electrically insulative battery cases at each end of said strap, an insulative housing secured to said strap, illuminating means having a pair of contacts in said housing, electrically conductive means embedded in said strap extending between said battery cases and said illuminating means, said housing comprising a cylindrical casing having one end secured to said strap, said casing having a threaded other end, a dome threadedly secured to said casing, and switch means carried by said casing selectively actuated by said dome, said switch means comprising a base ring secured between said strap and said casing, said base ring having a finger extending inwardly therefrom, a spring engaging said finger and said illuminating means and providing electrical connection between said finger and a contact of said illuminating means, an upper ring carried by said casing, said spring further urging said illuminating means upwardly to move the other contact of said illuminating means out of engagement with said upper ring, said upper ring having a downwardly extending tooth, said conductive means being attached to said base ring and said tooth, said dome selectively urging said illuminating means to complete an operative electrical circuit with said upper ring upon rotation of said dome to move said other contact downwardly into engagement with said upper ring, and means for attaching said strap to an animal harness, said means comprising a plurality of loops secured to said strap.

2. An animal harness light comprising an elongated flexible electrically insulative strap, electrically insulative battery cases at each end of said strap, an insulative housing secured to said strap, illuminating means having a pair of contacts in said housing, electrically conductive means embedded in said strap extending between said battery cases and said illuminating means, said housing comprising a cylindrical casing having one end secured to said strap, said casing having a threaded other end, a dome threadedly secured to said casing, and switch means carried by said casing selectively actuated by said dome, said switch means comprising a base ring secured between said strap and said casing, said base ring having a finger extending inwardly therefrom, a spring engaging said finger and said illuminating means and providing electrical connection between said finger and a contact of said illuminating means, an upper ring carried by said casing, said spring further urging said illuminating means upwardly to move the other contact of said illuminating means out of engagement with said upper ring, said upper ring having a downwardly extending tooth, said conductive means being attached to said base ring and said tooth, said dome selectively urging said illuminating means to complete an operative electrical circuit with said upper ring upon rotation of said dome to move said other contact downwardly into engagement with said upper ring.

References Cited in the file of this patent

UNITED STATES PATENTS

| | | |
|---|---|---|
| 1,615,067 | Boerman | Jan. 18, 1927 |
| 1,623,002 | Gossett | Mar. 29, 1927 |
| 1,662,668 | Gossett | Mar. 13, 1928 |
| 1,752,343 | Kann | Apr. 1, 1930 |
| 2,259,443 | Geier | Oct. 21, 1941 |
| 2,366,929 | Pfeil | Jan. 9, 1945 |